Sept. 30, 1969 T. KLEIN ET AL 3,470,076

METHOD OF REMOVING ALKALI METAL IMPURITY FROM AN OXIDE COATING

Filed Jan. 10, 1967

INVENTORS
THOMAS KLEIN
BY KEITH H. NICHOLAS

AGENT

United States Patent Office 3,470,076
Patented Sept. 30, 1969

3,470,076

METHOD OF REMOVING ALKALI METAL IMPURITY FROM AN OXIDE COATING

Thomas Klein, Palo Alto, Calif., and Keith Harlow Nicholas, Reigate, Surrey, England, assignors, by mesne assignments, to U.S. Philips Corporation, New York, N.Y., a corporation of Delaware Filed Jan. 10, 1967, Ser. No. 608,427
Claims priority, application Great Britain, Dec. 23, 1966, 1,075/66
Int. Cl. B01k 1/00
U.S. Cl. 204—130 11 Claims

ABSTRACT OF THE DISCLOSURE

A method of removing alkali metal ion impurity from an oxide formed on a semiconductor body is disclosed wherein the body is first heated and then applying a liquid metal which has affinity for alkali metal ions and which does not wet the oxide and applying a voltage across the oxide coating whereby the alkali metal ion impurity is transported to the liquid metal, and then removing the metal with its content of alkali metal ions.

Figure 1:
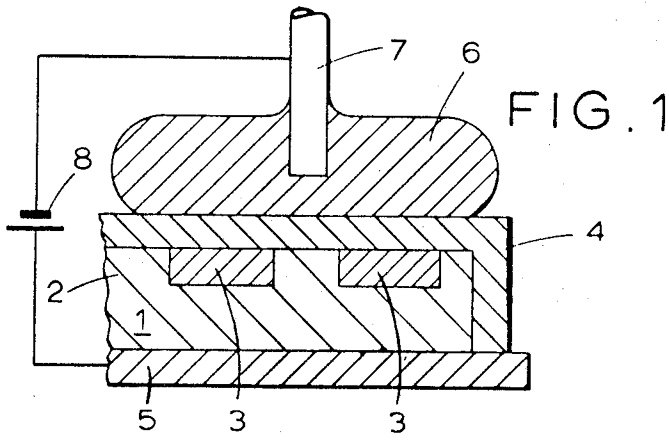

The invention relates to improvements in and relating to the manufacture of semiconductor devices.

In the manufacture of a semiconductor device, an oxide coating may be provided on a semiconductor body, for example, a silicon body may be heated in an atmosphere of dry or wet oxygen to provide a silicon oxide coating. The oxide coating may be partially removed to form windows through which a significant impurity, for example, boron is diffused into the body in the further manufacture of the device. More than one such diffusion step may be effected and further oxide coating steps may be effected, for example a subsequent oxide coating step may be effected to fill existing windows before making other different windows. Such oxide coating and diffusion steps involve heating at a reasonably elevated temperature for a not inconsiderable time. The heating is usually effected in glass or silica tubes and it is found that the oxide coating absorbs an amount of ions of alkali metals which may derive from the tube. In general the alkali metals lithium, sodium and potassium are of interest in this context and of these sodium is usually most seriously involved.

When the device is in use and voltages are applied, the device is heated. The combined effect of the elevated temperature and the applied voltages may result in the migration of the alkali metal ions to the semiconductor oxide interface, where they may give rise to undesired surface charges on a p-type semiconductor substrate and may induce inversion layers. As a result of the migration the device may show instability. Thus there may be changes in the leakage current across semiconductor junctions, in breakdown voltages, in current gains and forward characteristics. This instability is especially evident in insulated-gate field-effect transistors where the operation involves the passage of current through a surface region of the body, and changes of turn-on voltages and of gain may be high.

According to the invention, a method of removing alkali metal ion impurity from an oxide coating provided on a semiconductor body, comprises the steps of heating the body, applying to the surface of the oxide coating a liquid metal which has an affinity for alkali metal ions and which does not wet the oxide and applying a voltage across the oxide coating whereby alkali metal ion impurity is transported to the liquid metal and then removing the metal with its content of alkali metal ions.

Where diffusion has been effected, the surface of the oxide coating may be changed into a "glass," for example a boron or phosphorus glass, during the diffusion. In this event, the glassy surface may be removed to expose the underlying oxide, for example with the aid of a suitable chemical etchant, before the liquid metal is applied to the surface.

The liquid metal may be an elementary metal. Thus, the body may be of silicon and the oxide coating of silicon oxide and the metal may be tin. The tin with its content of alkali metal ions may be removed in the liquid state or may be solidified before removing. Since tin does not wet silicon oxide, the liquid tin readily runs off or may readily be shaken off the oxide coating. Solidified tin is also readily removable, for example by peeling it off the oxide coating. It is mentioned that tin forms a eutectic with sodium at 220° C. containing 1% by weight of sodium. Tin has an affinity for sodium and lithium. Alternatively, the metal may be mercury, the mercury with its content of alkali metal ions being removed in the liquid state or frozen and removed in the solid state. It is mentioned that mercury forms an eutectic with sodium at 21° C. containing 15% by weight of sodium. Mercury has an affinity for sodium, lithium and potassium.

As an alternative, the liquid metal may be an alloy. An alloy of tin and mercury may be used.

The body may be dipped into a liquid bath of the metal. In this case care must be taken that the connection to the body provided for applying the voltage across the oxide coating is not shorted out by the liquid metal of the bath. The body may be dipped positively into the bath by an appropriate movable securing member or the body may be allowed to float on the surface of the bath. As an alternative, the liquid metal may be contained in a vertical tube and the body with the oxide coating held against a stop integral with the tube so that a predetermined area of the oxide coating is in contact with the liquid metal. The stop may be the end surface of the tube in which case the tube is filled with liquid metal right to the top so that the oxide coating may make contact with the liquid over an area limited only by the inner perimeter of the tube. The level of the liquid metal may be adjusted before the body is positioned on the stop or the body may be positioned on the stop and the level of the liquid metal raised thereafter. As a further alternative, the liquid metal may be applied as a drop or series of drops to rest on the upper surface of the oxide coating provided on the semiconductor body, the position of the drop, or the positions of the drops, being chosen so that alkali metal ions are removed from and around an area or areas, at which the presence of alkali metal ions is disadvantageous in view of the use to which it is intended to put the body. In this connection, it is mentioned that lateral migration is not, in general, greatly favoured by voltages applied in use and that the lateral extent of a drop may readily be made very considerably greater than the thickness of the oxide layer which is contaminated with alkali metal ions.

If a bath is used, a contact is provided in or at the surface of the bath and if a drop is used contact is provided with the drop, for example, with the aid of a wire dipping into the drop.

It is advantageous if the removal of sodium impurity is effected at a stage in the manufacture of a semiconductor device at which diffusion steps have been completed and before windows are openeed in the oxide layer to provide access to the semiconductor material underlying the oxide layer. Further steps involving the provision of contacts or alloying to the semiconductor body are carried out for shorter times and at temperatures lower than those at which oxide coating and diffusion are carried out so that further alkali metal ion contamination can be made negligible. Finally, if desired, after treatment to remove alkali metal ions, conductors may be provided on the oxide coating and may be provided at the same time as the contacts are provided.

The invention also relates to a semiconductor body having an oxide coating from which alkali metal ion impurity has been removed by the method according to the invention and to a semiconductor device when made from such a semiconductor body.

Figure 2:
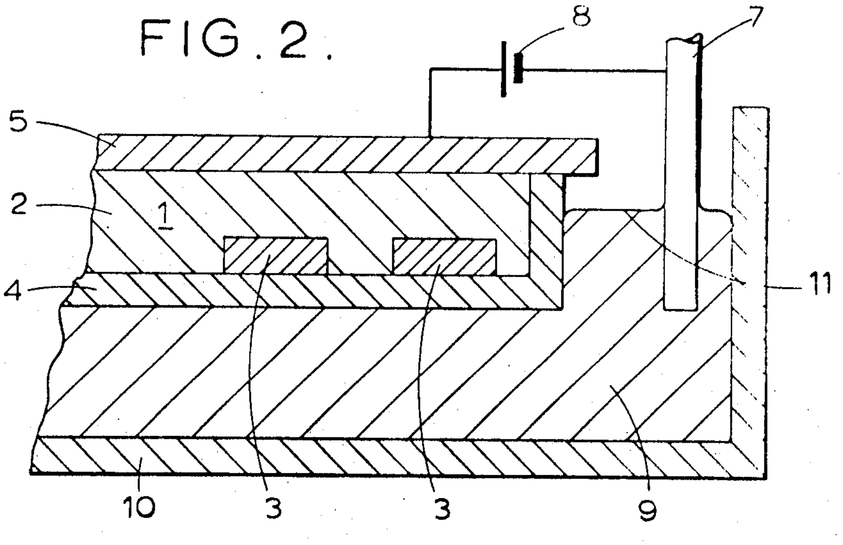
Figure 3:
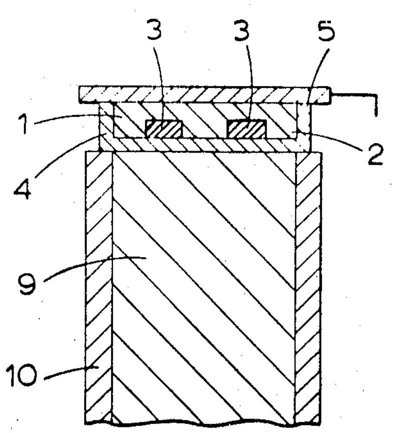

Embodiments of the method according to the invention will now be described, by way of example, with reference to the diagrammatic drawing accompanying the specification, in which:

FIGURE 1 illustrates the method according to the invention with the use of a drop of liquid metal, FIGURE 2 illustrates the method according to the invention with the use of a bath of liquid metal, and FIGURE 3 illustrates the method according to the invention with the use of a vertical tube filled with liquid metal.

Referring now to FIGURE 1, a semiconductor body 1 of silicon has an n-type region 2, doped with phosphorus, and two n-type regions 3 formed by diffusion of boron into the body of way of windows made in an oxide coating. Boron may be diffused into silicon by heating boron nitride in a furnace tube through which a current of nitrogen gas is flowing, to a temperature of 1,000° C. and causing the resultant atmosphere to flow over a silicon body heated to a temperature of 1,100° C. After the diffusion it is found that a boron glass has formed at the surface of the oxide layer. This surface glass is removed by a short etch in a siutable etchant. Depending upon the deviation of the etching and the nature of the etchant some or all of the oxide layer is removed together with the surface glass. One suitable etchant is made by adding 1 part by weight of ammonium fluoride to 4 parts of water and adding thereto 3% by volume of 40% hyrofluoric acid. The oxide is then regrown so that either a new oxide layer is formed or the windows in a remanent oxide layer are filled with oxide. The oxide layer 4 results. An oxide coating about 0.2$\mu$ thick may be provided on silicon by a "dry" process by heating a silicon body in a current of dry oxygen and an inert carrier gas, such as nitrogen for 1 hour at 1200° C. As alternatives, a similar thickness may be provided by "wet" processes by heating the body in a current of oxygen and water vapour or water vapour, in each case together with an inert carrier gas, for 15 minutes at 1,000° C. If desired, when the coating it provided by a wet process, the body with the oxide coating may be given a post-bake, for example at 400° C. for 2 hours, in order to remove hydrogen from the coating.

A back contact 5, in the form of a metal strip, is pressed against the body to provide connection to the region 2. As an alternative a conductive probe may be pressed against the body. Although, in the description given above, boron glass is removed, it is not always necessary to remove such a surface glass. Thus, if a phosphorus glass layer is formed in which the silicon oxide contains phosphorus oxide, its removal is not necessary.

The steps indicated above are known in the semiconductor art for the manufacture of insulated-gate field-effect transistors and will not be described here in greater detail. The body is placed on a hot plate, a solid drop of tin 6 is placed on the oxide coating and a metal contact wire 7 is inserted in the drop 6 when the drop 6 becomes liquid. As an alternative, the whole may be placed in an oven. The whole is heated to a temperature of 250° C. and the back contact 5 and the wire 7 are connected across a supply 8 of direct current. Sodium and lithium ions pesent as contamination in the oxide coating are removed. The ions are mobile at 250° C. and are caused to move by the voltage applied by the source 8 into the liquid tin 6. With a voltage of 5 v. to 20 v. a period of 5 minutes at 250° C. is found to be sufficient.

The whole is taken from the plate or oven and allowed to cool. The battery is disconnected. The tin 6 containing the extracted alkali metal ions solidifies and is readily peeled from the oxide 4.

In known manner windows are opened in the oxide layer to provide contacts to the regions 3 and a gate electrode is provided on the oxide layer 4 to complete an insulated-gate field-effect semiconductor device. These steps require heating only to 200° C. and only for 20 minutes, so that the risk of further alkali metal ion contamination is not great.

The description above is given with reference to a single device. If desired, the treatment may be applied to the slice of semiconductor material comprising a large number of pairs of diffused regions in which case it is convenent to use a single large drop of tin 6 covering substantially an entire surface of the slice.

In general, the drop or drops of tin may readily be made large enough to cover substantially the entire area or the areas concerned of the oxide coating.

As an alternative a drop or drops of mercury may be used. If mercury is used the temperature of heating need not be so high since mercury is liquid at room temperature. A temperature of 140° C. to 240° C. may be used. If mercury is used, care should be taken that mercury fumes are not permitted to cause damage. As stated above, mercury has an affinity for potassium as well as for sodium and lithium.

FIGURE 2 illustrates tn alternative way of carrying out the method according to the invention in which the device or slice is dipped into a bath 10 of mercury 9 at 200° C. The bath could alternatively be of tin. With the mercury at 200° C. and a voltage of 10v., a time of 5 mins. is found to be sufficient. When using a bath of tin or mercury, the position of the device relative to the liquid level 11 should not be such that the back contact 5 is shorted to the liquid 9.

When the body 1 is removed from the liquid 9, the mercury or tin normally runs off. The body 1 may be shaken to assist the running off process.

FIGURE 3 illustrates a third way of carrying the method according to the invention into effect. The liquid metal 9 is contained within a vertical silica tube 10. The body 1 comprising the regions 3 and the region 2 and having a layer 4 of oxide is placed on the top of the tube 10 and held in position by a back contact 5. The contact 5 is connected to one terminal of a source of direct current (not shown). The initial maximum level of the liquid metal may be a little above the level of the upper end of the tube if permitted by the surface tension of the liquid metal so that when the body 1 is pressed onto the top of the tube 10 the liquid metal makes satisfactory contact with the oxide layer 4 over the entire area within the inner perimeter of the end of the tube 10.

As an alternative, the body 1 may first be placed in position and the level of the liquid metal 9 adjusted thereafter by downward movement of the tube 10 relative to a reservoir (not shown). The other terminal of the voltage source may in this case be connected to the liquid metal in the reservoir.

The reservoir will be heated and the tube 10 and the liquid metal 9 in the tube 10 will be heated, for example, with the aid of a resistive heating wire (not shown) wrapped round the outside of the tube 10.

Although a single device is shown in FIGURE 3, it may be more convenient to provide a large number of pairs of regions 3 in a single slice of semiconductor material and to make the inner dimensions of the tube 10 just smaller than those of the perimeter of the slice. If a slice is used it will normally be broken subsequently to provide a single device or multiple devices on each piece of the slice.

Although the description given above relates to an insulated-gate field-effect transistor, the method according to the invention may advantageously be used in the manufacture of other semiconductor devices in which an oxide layer is provided.

What we claim is:

1. A method of removing alkali metal ion impurity from an oxide coating provided on a semiconductor body, comprising the steps of heating the body, applying to the surface of the oxide coating a liquid metal which has an affinity for alkali metal ions and which does not wet the oxide and applying a voltage across the oxide coating whereby alkali metal ion impurity is transported to the liquid metal, and then removing the metal with its content of alkali metal ions.

2. A method as claimed in claim 1, in which the metal is an elementary metal.

3. A method as claimed in claim 1, in which the body is of silicon, the oxide is of silicon oxide, and the metal is tin.

4. A method as claimed in claim 1, in which the body is of silicon, the oxide is of silicon oxide, and the metal is mercury.

5. A method as claimed in claim 1, in which the body is of silicon, the oxide is of silicon oxide, and the metal is an alloy of tin and mercury.

6. A method as claimed in claim 1, in which the metal is removed from the oxide coating while in the liquid state.

7. A method as claimed in claim 1 in which the body is dipped into a liquid bath of the metal.

8. A method as claimed in claim 1, in which the liquid metal is contained in a vertical tube, and the body with the oxide coating is held against a stop integral with the tube so that a predetermined area of the oxide coating is in contact with the liquid metal.

9. A method as claimed in claim 8, in which the stop is the end surface of the tube.

10. A method as claimed in claim 8, in which the level of the liquid metal is adjusted before the body is positioned on the stop.

11. A method as claimed in claim 1, in which the removal of alkali metal ion impurity is effected at a stage in the manufacture of a semiconductor device at which diffusion steps have been completed and before windows are opened in the oxide layer to provide access to the semiconductor material underlying the oxide layer.

References Cited

UNITED STATES PATENTS 3,303,115 2/1967 Nitsche ------------ 204—130

JOHN H. MACK, Primary Examiner

T. TUFARIELLO, Assistant Examiner